United States Patent
McKenzie et al.

(10) Patent No.: US 12,331,877 B1
(45) Date of Patent: Jun. 17, 2025

(54) SMART DEVICE ACCESSORY AND RELATED METHODS

(71) Applicants: Scott McKenzie, Boca Raton, FL (US); Bryce Alsten, Lighthouse Point, FL (US)

(72) Inventors: Scott McKenzie, Boca Raton, FL (US); Bryce Alsten, Lighthouse Point, FL (US)

( * ) Notice: Subject to any disclaimer, the term of this patent is extended or adjusted under 35 U.S.C. 154(b) by 0 days.

(21) Appl. No.: 18/378,024

(22) Filed: Oct. 9, 2023

Related U.S. Application Data

(62) Division of application No. 16/574,767, filed on Sep. 18, 2019, now abandoned.

(60) Provisional application No. 62/733,334, filed on Sep. 19, 2018.

(51) Int. Cl.
| | | |
|---|---|---|
| *F16M 13/06* | (2006.01) | |
| *A45C 11/18* | (2006.01) | |
| *B67B 7/16* | (2006.01) | |
| *F16M 13/02* | (2006.01) | |
| *A45C 11/00* | (2006.01) | |

(52) U.S. Cl.
CPC ............ *F16M 13/06* (2013.01); *A45C 11/182* (2013.01); *B67B 7/16* (2013.01); *F16M 13/02* (2013.01); *A45C 11/002* (2025.01); *A45C 11/003* (2025.01); *A45C 2200/15* (2013.01)

(58) Field of Classification Search
CPC ...... F16M 13/02; F16M 13/06; A45C 11/182; A45C 2011/002; A45C 2011/003; A45C 2200/15

USPC ........................................................ 224/576
See application file for complete search history.

(56) References Cited

U.S. PATENT DOCUMENTS

| | | |
|---|---|---|
| D266,645 S | 10/1982 | Pittenger |
| D660,305 S | 5/2012 | Ho |
| D715,619 S | 10/2014 | Fritz |
| 9,421,920 B2 | 8/2016 | Jang |
| 9,804,636 B2 * | 10/2017 | Barnett ................. G06F 1/1635 |
| D844,598 S | 4/2019 | Jang |
| 10,278,299 B2 | 4/2019 | Kim |
| 10,627,046 B1 | 4/2020 | Jang |
| D883,974 S | 5/2020 | Alsten |
| 2003/0067397 A1 | 4/2003 | Trimble |
| 2004/0232291 A1 * | 11/2004 | Carnevali .............. F16M 13/00 |
| | | 248/206.5 |
| 2004/0252030 A1 | 12/2004 | Trimble |
| 2009/0090750 A1 | 4/2009 | Alcenat |
| 2012/0042476 A1 | 2/2012 | Karmatz |
| 2012/0214545 A1 | 8/2012 | Johnson |

(Continued)

*Primary Examiner* — Peter N Helvey
(74) *Attorney, Agent, or Firm* — ALLEN, DYER, DOPPELT + GILCHRIST, P.A.

(57) ABSTRACT

A smart device accessory includes a planar support, a neck and a swivel and pivot joint. The neck extends in the length direction between a first neck end and a second neck end at the first support end, the neck having a neck width transverse the length direction less than the support width, curved shoulders between the first support end and the second neck end transitioning from the support width to the neck width. The swivel and pivot joint has a hub pivotably connected to the first neck end such that the neck and planar support are pivotable and rotatable relative thereto. Various bases can connect the accessory to the smart device. The accessory can be incorporated into magnetic mount arrangements and device locator systems.

18 Claims, 9 Drawing Sheets

(56) References Cited

U.S. PATENT DOCUMENTS

| | | |
|---|---|---|
| 2013/0279098 A1 | 10/2013 | Ho |
| 2014/0027482 A1 | 1/2014 | Crawford |
| 2014/0084034 A1 | 3/2014 | Wangercyn, Jr. |
| 2017/0349116 A1* | 12/2017 | Liao ..................... H04B 1/3877 |
| 2017/0359095 A1* | 12/2017 | Fleckenstein .......... F16M 11/24 |

* cited by examiner

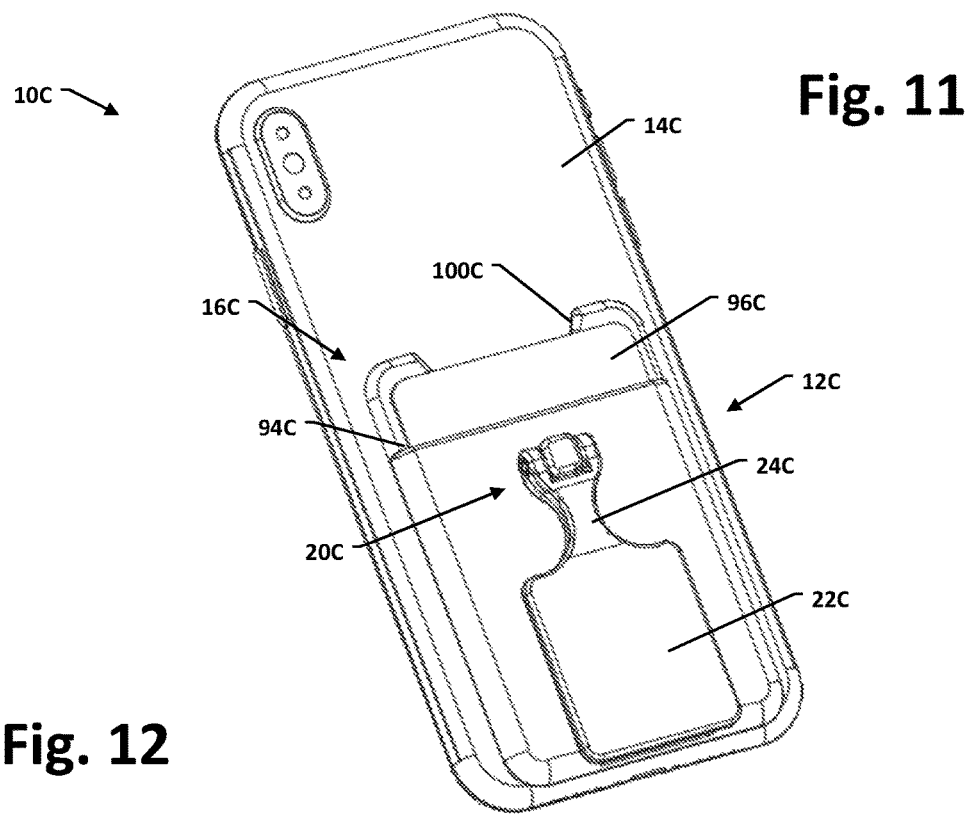
Fig. 11
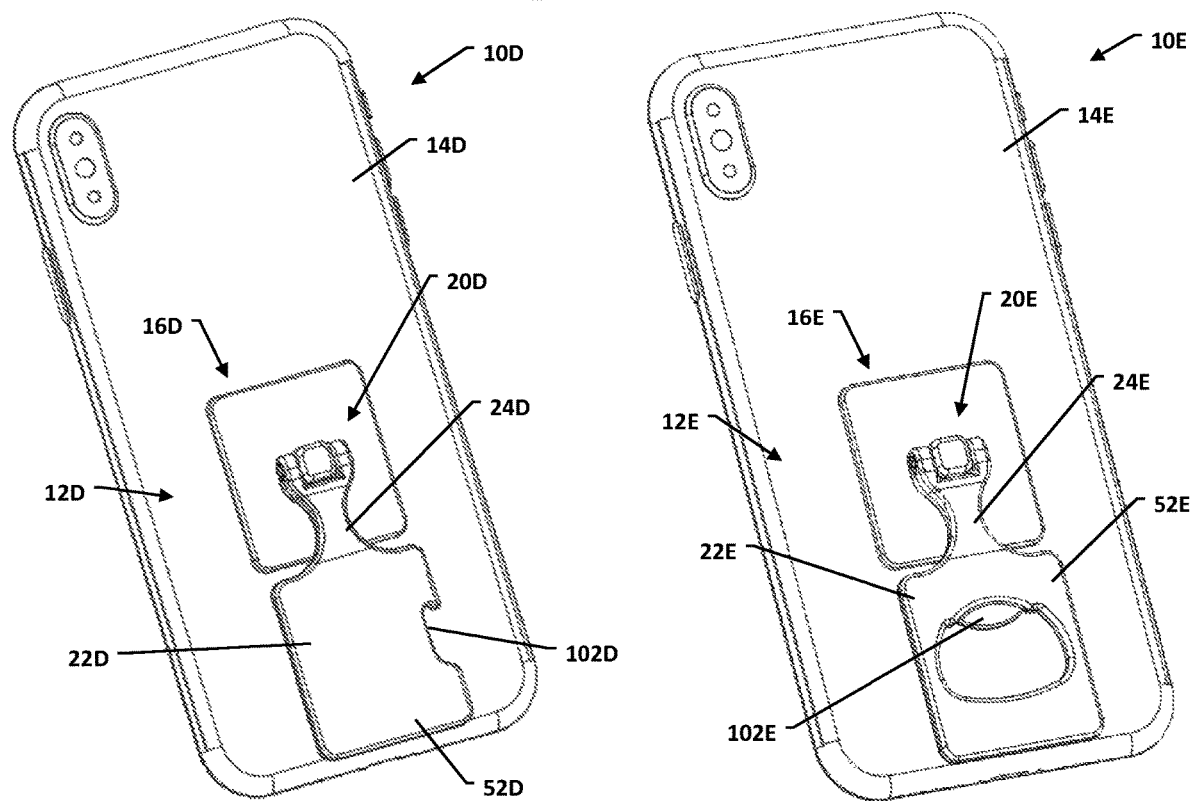
Fig. 12
Fig. 13

SMART DEVICE ACCESSORY AND RELATED METHODS

CROSS-REFERENCE TO RELATED APPLICATION

This application is a divisional of U.S. Non-provisional patent application Ser. No. 16/574,767, filed on Sep. 18, 2019, which claims the benefit of U.S. Provisional Patent Application Ser. No. 62/733,334, filed on Sep. 19, 2018, the contents of which are herein incorporated by reference in their entirety.

BACKGROUND OF THE INVENTION

While smart devices, such as smart phones and tablet computers, allow users to literally hold previously undreamt of computing capabilities in the palms of their hands, the shape and size of such devices can often make actually holding them physically awkward and uncomfortable. Moreover, situations frequently arise where a user will find it convenient, or even necessary, to continue to view a smart device while not holding it. Simply laying the smart device on a table or trying to lean it against an available prop is not always a satisfactory alternative.

With this in mind, several accessories have been developed to aid users in holding their smart devices and/or supporting such devices in desired positions for hands-free use. One well-known example can be seen in U.S. Pat. No. 8,560,031. While this accessory can be quite useful when holding a smart device, it is of limited effectiveness as a support for a smart device when set down. Another example can be found in U.S. Pat. No. 9,421,920. This accessory offers users greater flexibility as a support for their smart devices than the preceding example; however, further improvements are possible.

SUMMARY OF THE INVENTION

In view of the foregoing, it is an object of the present invention to provide an improved smart device accessory that facilitates both holding of a smart device, as well as support of the smart device when set down. According to an embodiment of the present invention, a smart device accessory includes a planar support, a neck and a swivel and pivot joint. The planar support has a main support body extending in a length direction between a first support end and a second support end, the planar support having a support width transverse the length direction. The neck extends in the length direction between a first neck end and a second neck end at the first support end, the neck having a neck width transverse the length direction less than the support width, curved shoulders between the first support end and the second neck end transitioning from the support width to the neck width. The swivel and pivot joint has a hub pivotably connected to the first neck end such that the neck and planar support are pivotable relative thereto through a pivot range of approximately 180 degrees, the hub being configured for rotatable attachment to a reverse surface of a smart device such that the hub, neck and planar support are rotatable relative thereto through a rotation range of approximately 360 degrees.

According to an aspect of the present invention, the accessory further includes a base configured for connection to the reverse surface of the smart device, the hub being rotatably attached to the base. According to another aspect, the base includes a base plate defining a central plate opening, and the hub includes a hub shaft extending through the central plate opening and being secured by a washer under the base plate. According to a further aspect, the base is incorporated into a case for the smart device.

According to an additional aspect, the accessory includes locator electronics arranged within the accessory, the locator electronics including an indicator, a battery, a transmitter/receiver, and a microcontroller, the locator electronics being configured to receive a signal and actuate the indicator in response thereto.

According to another aspect of the present invention, a combination includes the smart device accessory and the smart device with the reverse surface rotatably attached to the hub. The hub can be directly connected to the reverse surface or connected to the reverse surface by a base rotatably attached to the hub.

According to a further aspect of the present invention, a magnetic mounting arrangement includes the smart device accessory, in which the planar support includes a magnetic material, and a magnetic mount including a mount base securable to a mounting surface and mounting face including another magnetic material magnetically connected to the planar support.

These and other objects, aspects and advantages of the present invention will be better appreciated in view of the drawings and following detailed description of preferred embodiments.

BRIEF DESCRIPTION OF THE DRAWINGS

FIG. 11-13 are perspective views of smart devices having smart device accessories attached thereto, according to additional embodiments of the present invention;

DETAILED DESCRIPTION OF PREFERRED EMBODIMENTS

Figure 1:
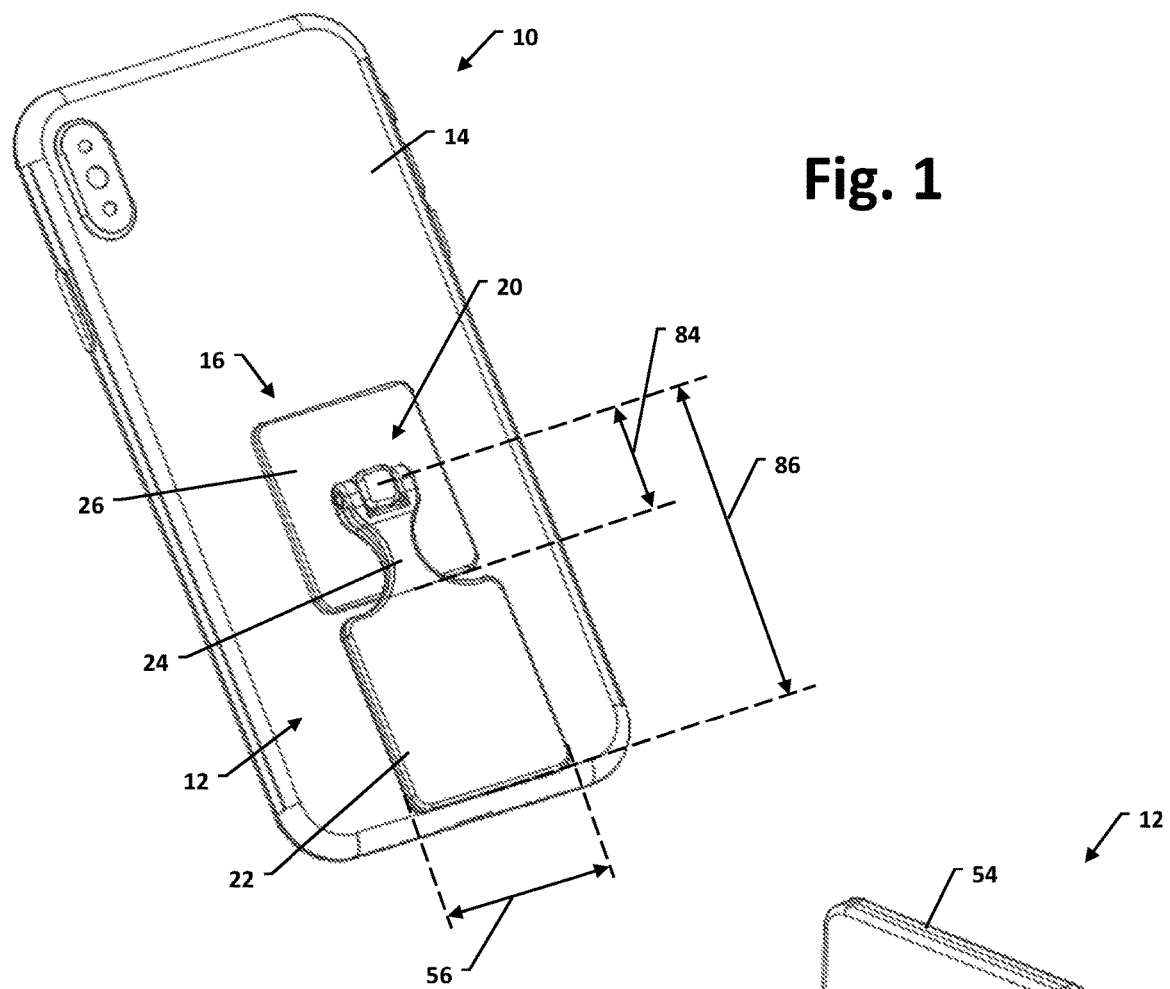
FIG. 1 is a perspective view of a smart device including a smart device accessory attached thereto, according to an embodiment of the present invention.
Figure 2:
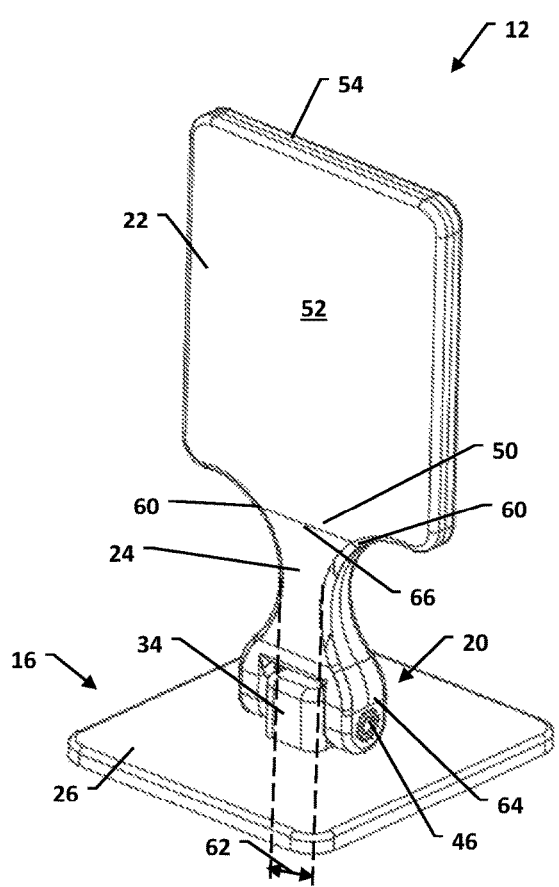
FIGS. 2 and 3 are different perspective views of the smart device accessory of FIG. 1.
Figure 3:
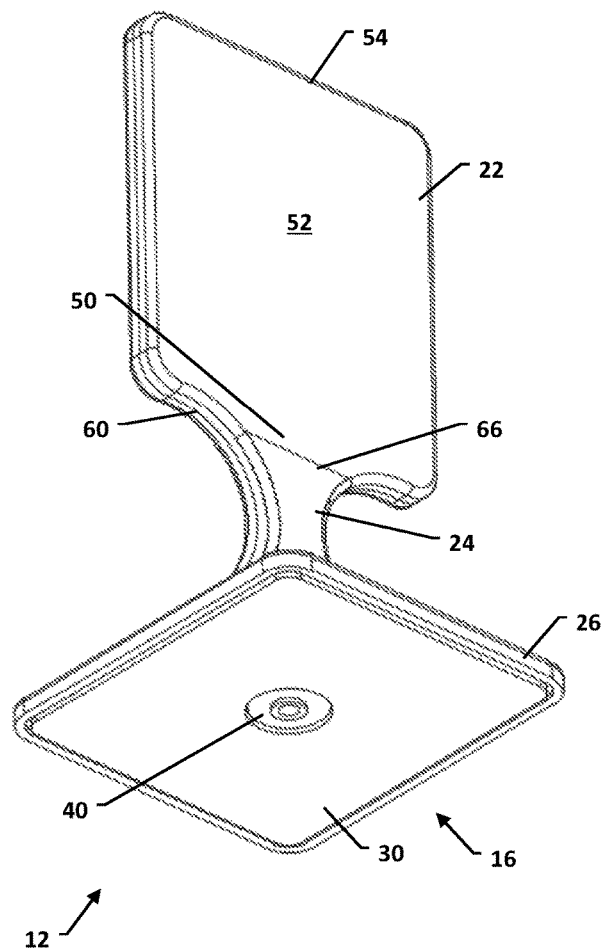

Referring to FIGS. 1-3, according to an embodiment of the present invention, a smart device 10 has a smart device accessory 12 attached to a reverse surface 14 (i.e., the surface opposite the screen) thereof. The smart device accessory 12 includes a base 16 connected by swivel and pivot joint 20 to a planar support 22 via a neck 24. As will be explained in greater detail below, the accessory 12 is configured to facilitate manual gripping of the smart device 10 and is also operable to support the smart device 10 through a wide range of orientations on an underlying surface.

In the depicted embodiment, the smart device 10 is a smart phone; however, the smart device accessory of the present invention is not necessarily limited to use in connection therewith. Those skilled in the art will appreciate that the dimensions and positioning of the smart device accessory can be adapted to work with smart phones of any size, as well as with other smart devices such as tablet computers. In fact, the accessory to facilitate gripping and hands-free support of any generally planar, handheld device—including non-electronic devices.

Figure 4:
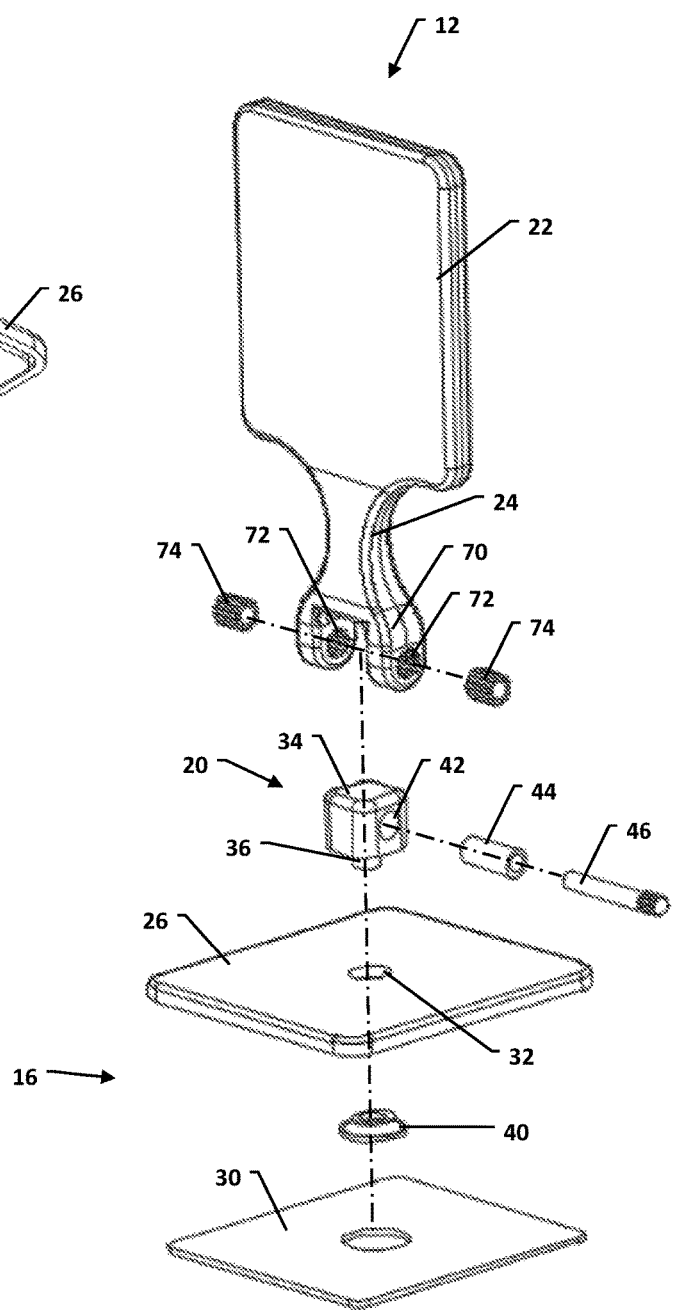
FIG. 4 is an exploded perspective view of the smart device accessory of FIG. 1.

The base 16 functions to secure the swivel and pivot joint 20 to the reverse surface 14 of the smart device 10. As will be further illustrated below, significant flexibility exists with respect to the design of the base 16. Referring also to FIG. 4, in the depicted embodiment the base 16 includes a plate 26 secured to the reverse surface 14 via an adhesive patch 30. A central opening 32 is defined in the base 16 to accommodate the joint 20.

The swivel and pivot joint 20 includes a hub 34 rotatably connected to the base 16 via a shaft 36 extending through the central opening 32. On the opposite side of the plate 26 from the hub 34, the shaft is secured via a washer 40 having a radial dimension larger than the opening 32. Preferably, sufficient friction exists between the hub 34 and the base 16 to maintain any desired rotational position of the hub 34 when supporting the smart device 10 while still readily allowing manual rotation into a desired rotational position by the user.

The hub 34 includes a pivot opening 42 extending therethrough transverse to the shaft 36 and parallel with the reverse surface 14 of the smart device 10. In the depicted embodiment, a sleeve 44 lines the opening 42 and a pivot pin 46 is rotatably accommodated in the sleeve 44. Opposite ends of the pivot pin 46 seat in the neck 24, such that the pivot pin 46 and neck 24 are pivotable together relative to the sleeve 44 and hub 34. As between the hub 34 and the base 16, sufficient friction preferably exists between the sleeve 44 and pin 46 to maintain any desired pivoted position of the neck 24 and planar support 22 when supporting the smart device 10 while still readily allowing manual pivoting into a desired pivoted position by the user.

It will be appreciated that the use of the sleeve 44 allows a robust and close tolerance interface with the pivot pin 46 even if a relatively less durable material, such as plastic, is used for the hub 34. It will be appreciated that, in some embodiments, the sleeve 44 could be omitted with the pin 46 rotating directly in the opening 42. Additionally, the swivel and pivot joint 20 could be configured such that the pin 46 was rotatably accommodated in the neck 24 while fixed (or also rotatable) relative to the hub 34. In some embodiments, the pivot pin 46 could be an integral portion of the hub 34.

The planar support 22 extends away from the swivel and pivot joint 20 from a first end 50 connected to the neck 24 across a main body 52 to a second end 54. The second end 54 preferably extends linearly and parallel to the reverse surface 14 to facilitate supporting the smart device 10 on an underlying surface. A width 56 of the planar support 22 at the first end 50 decreases via shoulders 60 to a smaller width 62 of the neck 60.

The neck 60 extends between a first end 64 connected to the swivel and pivot joint 20 and a second end 66 connected the first end 50 of the planar support 22 via the shoulders 60. The first end 64 includes a fork 70 with pivot openings 72 formed in opposite sides thereof accommodating opposite ends of the pivot pin 46. It will be appreciated that the hub 34 could be forked instead of or in addition to the first end 64 of the neck 60. If the neck 60 is made of plastic of other less durable material, inserts 74 of metal or other more durable material can be located in the openings 72 to better engage opposite ends of the pin 46.

Figure 5:
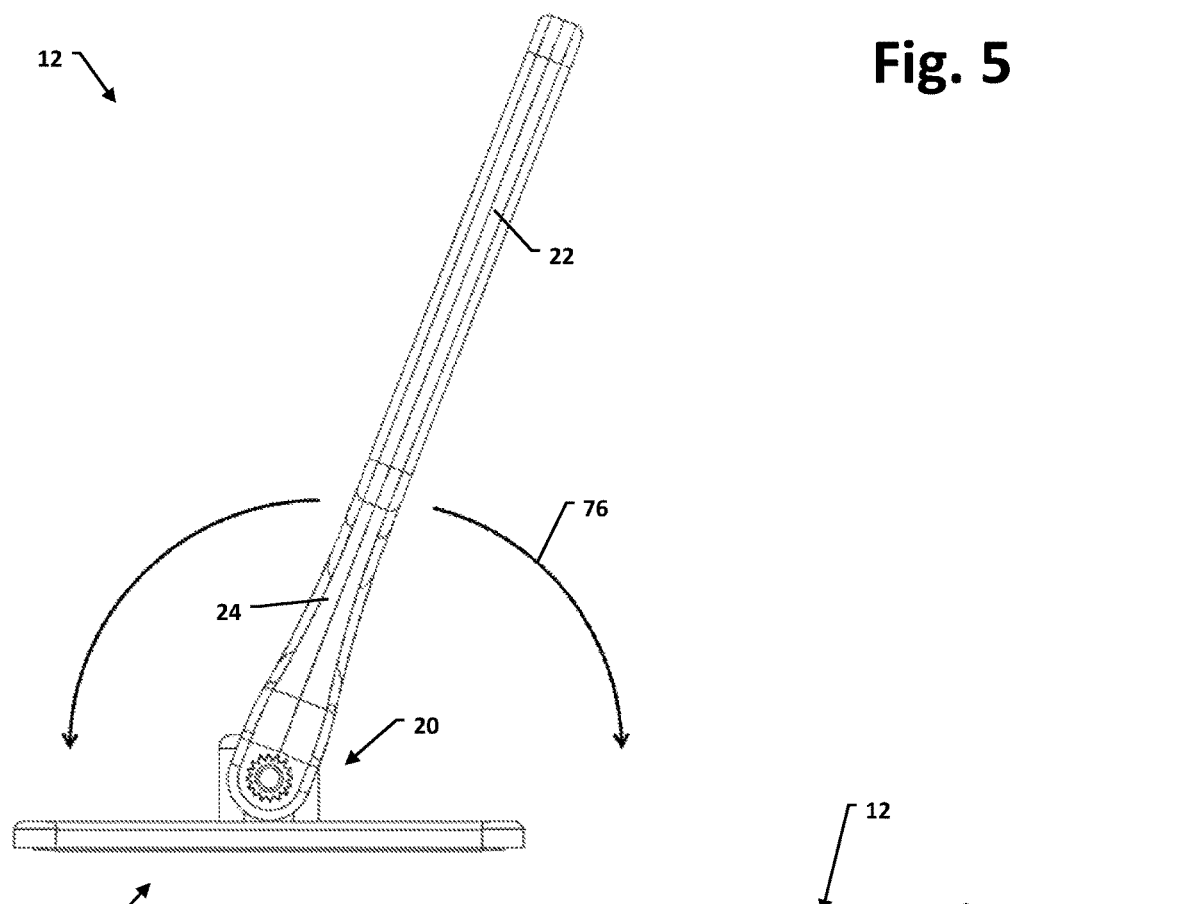
FIG. 5 is a side view of the smart device accessory of FIG. 1.
Figure 6:
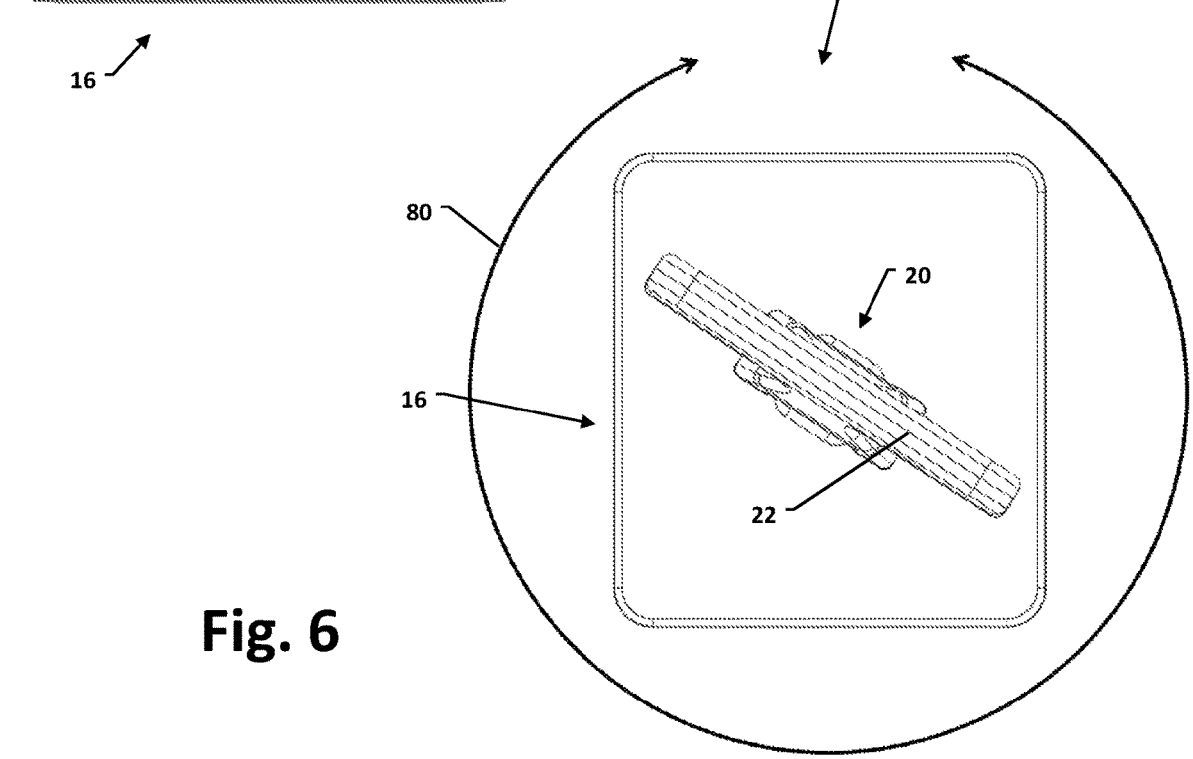
FIG. 6 is an end view of the smart device accessory of FIG. 1.

In operation, gripping of the smart device 10 is facilitated by a user placing adjacent fingers on opposite sides of the neck 24 such that the fingers are retained between the reverse surface 14 and the shoulders 60. Referring to FIGS. 5 and 6, via the swivel and pivot joint 20, the user can pivot the planar support 22 through a pivot range 76 of 180 degrees and a rotation range 80 of 360 degrees.

Figure 7:
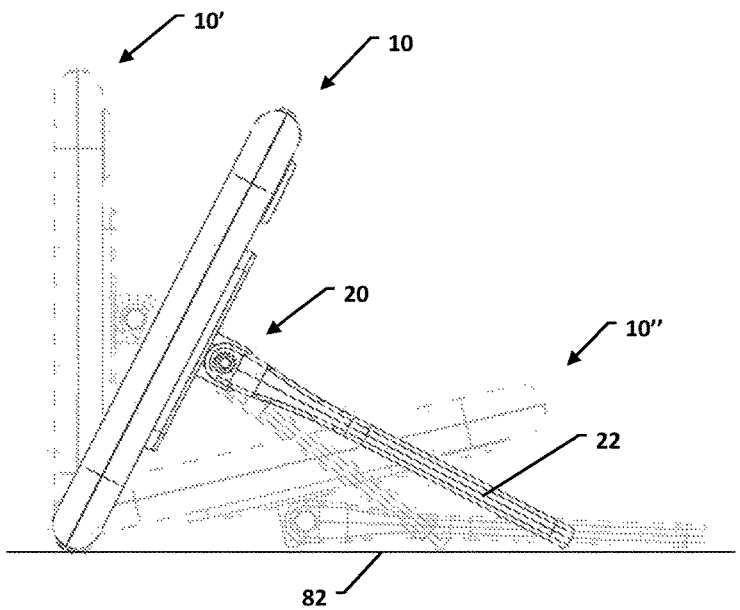
FIG. 7 is a side view of the smart device accessory of FIG. 1 supporting the smart device in a landscape mode, with extreme positions shown in broken lines.
Figure 8:
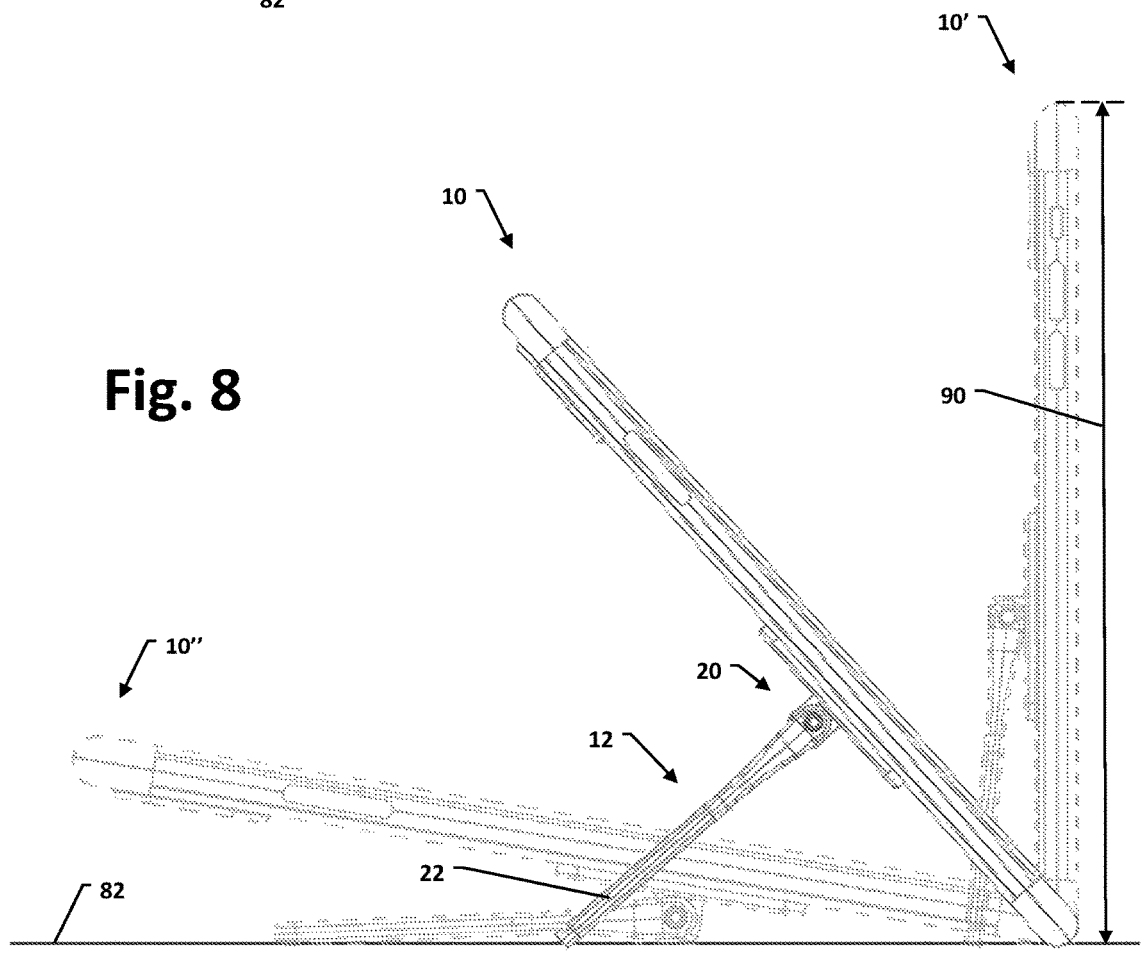
FIG. 8 is a side view of the smart device accessory of FIG. 1 supporting the smart device in a portrait mode, with extreme positions shown in broken lines.

Referring to FIG. 7, to support the smart device 10 on an underlying surface 82 in a landscape orientation, a user rotates the planar support 22 such that the width 56 extends in parallel with the long edges of the smart device 10 and pivots the planar support 22 to support the device 10 at any desired angle from perpendicular with the underlying surface 82 (as shown in broken lines at 10') to nearly horizontal (10"). Similarly, referring to FIG. 8, to support the smart device 10 on an underlying surface 82 in a portrait orientation, a user rotates the planar support 22 such that the width 56 extends in parallel with the short edges of the smart device 10 and pivots the planar support 22 to support the device 10 at any desired angle from perpendicular with the underlying surface 82 (10') to nearly horizontal (10"). When use of the accessory 12 is no longer desired, a user simply rotates and pivots the planar support 22 to lie flat against the reverse surface (as in FIG. 2).

As indicated above, the dimensions and positioning of a smart device accessory 12 according to the present invention can be adjusted, as necessary, based on the size of a smart device to be accommodated. In practice, however, two different sizes—smaller device for smart phones and a larger device for tablet computers—will be sufficient to accommodate most commercially available smart devices. Additional variants might be desirable to better accommodate differences in the range of possible users; for instance, a variant with the width 62 and length 84 of the neck reduced for users with smaller hands.

In general, the width 56 of the planar support 22 should be at least wide enough to engage adjacent fingers of a typical user's hand, while the width 62 of the neck 24 should be narrow enough to comfortably fit between the adjacent fingers. The length 84 of the neck should be sufficient to closely but readily accommodate the adjacent fingers between the base 16 (and/or reverse surface 14) and the planar support 22. An overall length 86 from the swivel and pivot joint 20 is preferably sufficient to allow the accessory 12 to support the device 10 nearly perpendicular in the portrait orientation with the joint 20 positioned at least approximately one third of a height 90 (in the portrait orientation) of the smart device from a lower edge (i.e., a short edge) thereof. The joint 20 is preferably positioned approximately midway between the long edges of the device 10.

As also indicated above, a wide variety of designs can be used for the base of a smart device accessory according to the present invention. In the following description of alternate embodiments, like components are identified by the same reference numbers with letters being used to distinguish embodiments (e.g., 12A, 12B). Except as indicated, the structure and function of like components is substantially identical.

Figure 9:
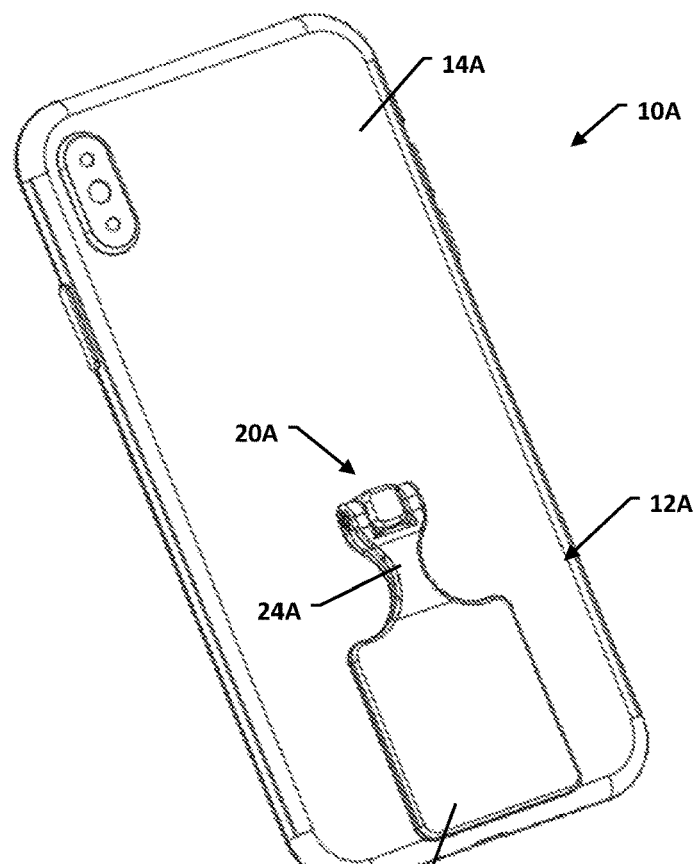
FIG. 9 is a perspective view of a smart device accessory integrated into a smart device, according to another embodiment of the present invention.

Referring to FIG. 9, the swivel and pivot joint 20A of a smart device accessory 12A is connected directly to the reverse surface 14A of a smart device 10A. Thus, the central opening 32 formed in the base 16, above (as in FIG. 4), is formed directly in the reverse surface 14A. Such a configuration could be advantageous, for instance, when the accessory 12A is intended as a built-in feature of a smart device 10A as originally sold.

Figure 10:
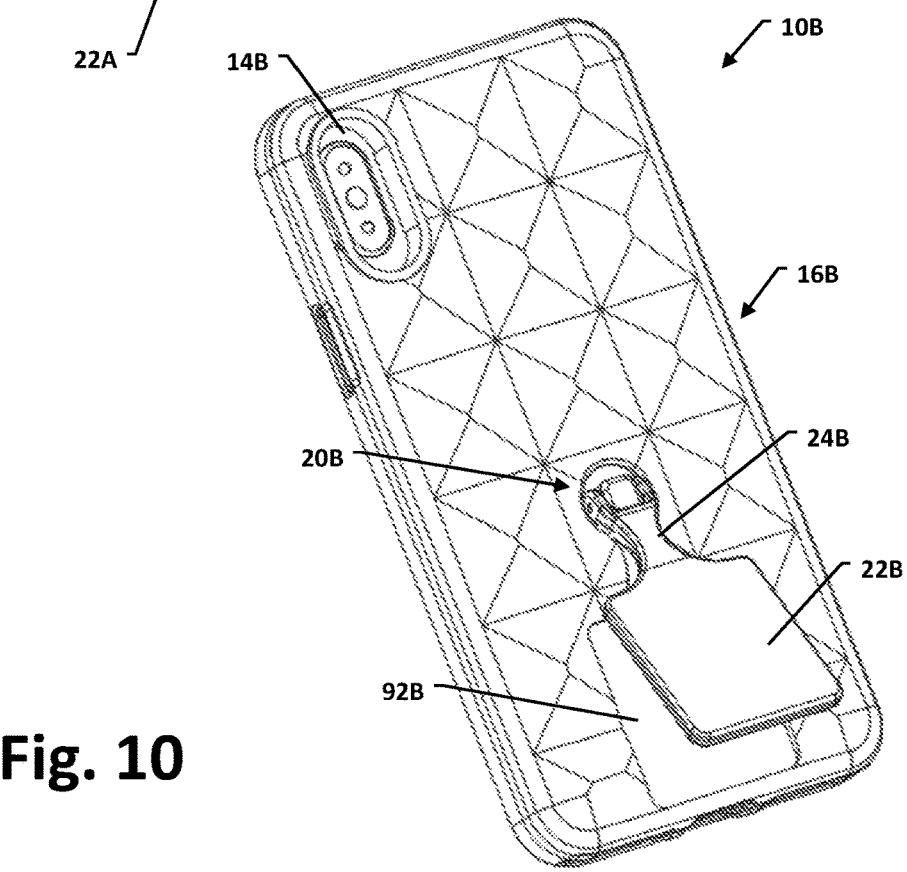
FIG. 10 is a perspective view of a smart device accessory integrated into a case for a smart device, according to a further embodiment of the present invention.
Figure 14:
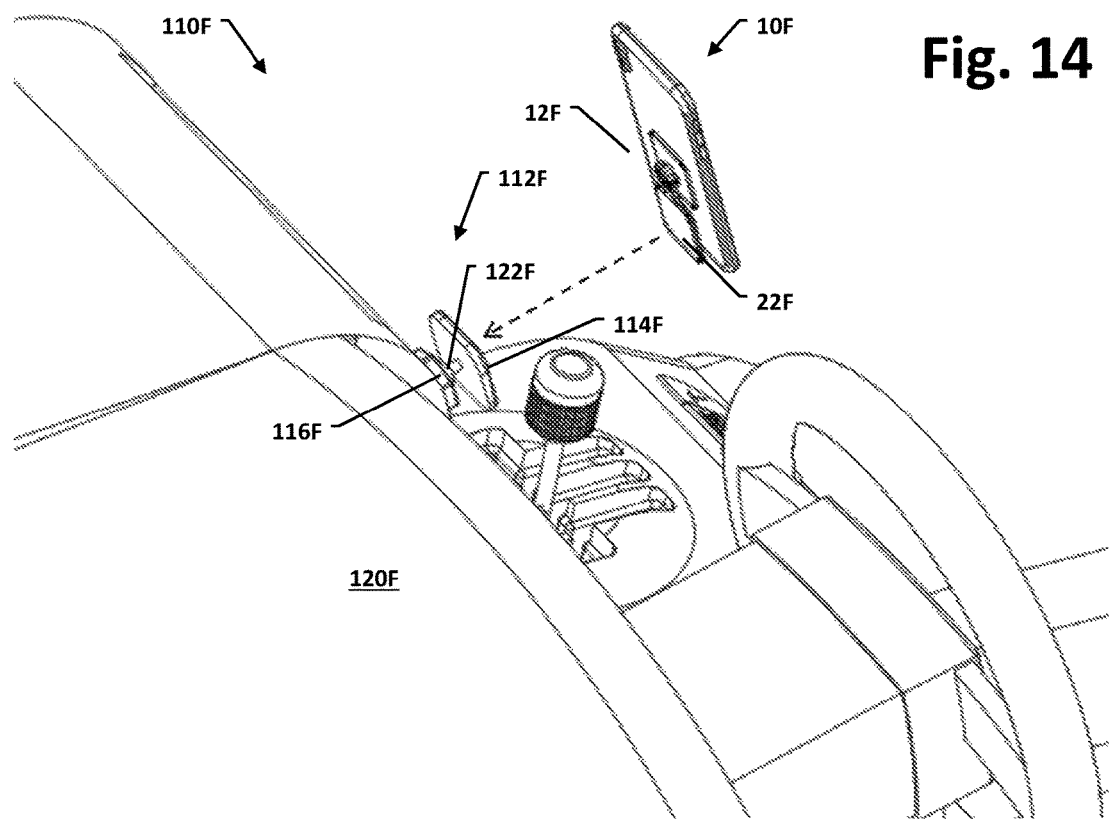
FIGS. 14 and 15 are perspective views a smart device having a smart device accessory attached thereto and working in conjunction with a magnetic mounting arrangement, according to another embodiment of the present invention.
Figure 15:
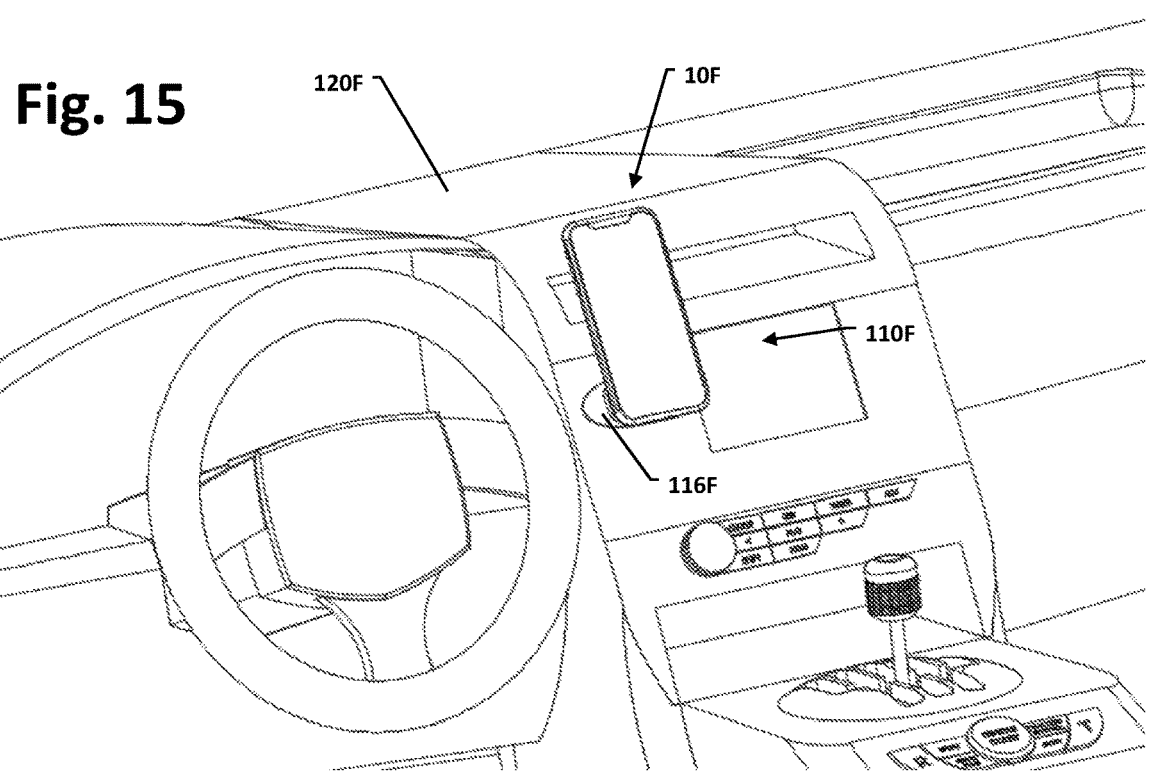

Referring to FIG. 10, a base 16B of the smart device accessory 12B can be formed as a case for the smart device 10B. Such a configuration helps ensure an optimal positioning for the accessory 12B on the device 10B, and also avoids the need for an adhesive patch or other fastening means for securing the accessory 12B to the reverse surface 14B. In the depicted embodiment, a recess 92B accommodates a thickness of the planar support 22B and neck 24B when folded flat against the device 10B.

Referring to FIG. 11, a base 16C of the smart device accessory 12C is enlarged relative to the base 16 and provided with a slot 94C dimensioned to hold one or more credit cards 96C (or the like) flat against the rear surface 14C of the smart device. A notch 100C in an upper edge of the base 16C facilitates extraction of the card(s) 96C.

Referring to FIG. 12, while the second end 54D of the planar support 22D should generally be flat enough to securely rest on an underlying surface and the first end 50D should comfortably engage adjacent fingers of a user, design flexibility exist within these relatively broad constraints. For example, a bottle opener 102D can be formed in a side of the main body 52D between the first and second ends 50D, 54D. Alternately, as in FIG. 13, a bottle opener 102E can be formed centrally formed extending through the main body 52E of the planar support 22E.

For additional convenience, a smart device accessory 12F can be used as part of a magnetic mounting arrangement 110F, together with a magnetic mount 112F. In the depicted embodiment, the planar support 22F is made from or otherwise incorporates a magnetic material. Likewise, a mount 112F has a mounting face 114F made from or otherwise incorporating a magnetic material. As used herein, "magnetic material" indicates a material either having properties of a permanent magnet or magnetizable in the presence of a permanent magnet so as to be attachable thereto. The magnetic material in one or both of the planar support 22F and mounting face 114F will have the properties of a permanent magnet.

The mount 112F has a mount base 116F securable to a desired mounting surface 120F; for instance, a vehicle dashboard in the depicted embodiment. For additional positioning flexibility, the mounting face 114F is connected to the mount base 116F by a ball joint 122F or the like. In use, a smart device 10F is supported adjacent to the mounting surface 120F by magnetically connecting the planar support 22F to the mounting face 114F.

Figure 16:
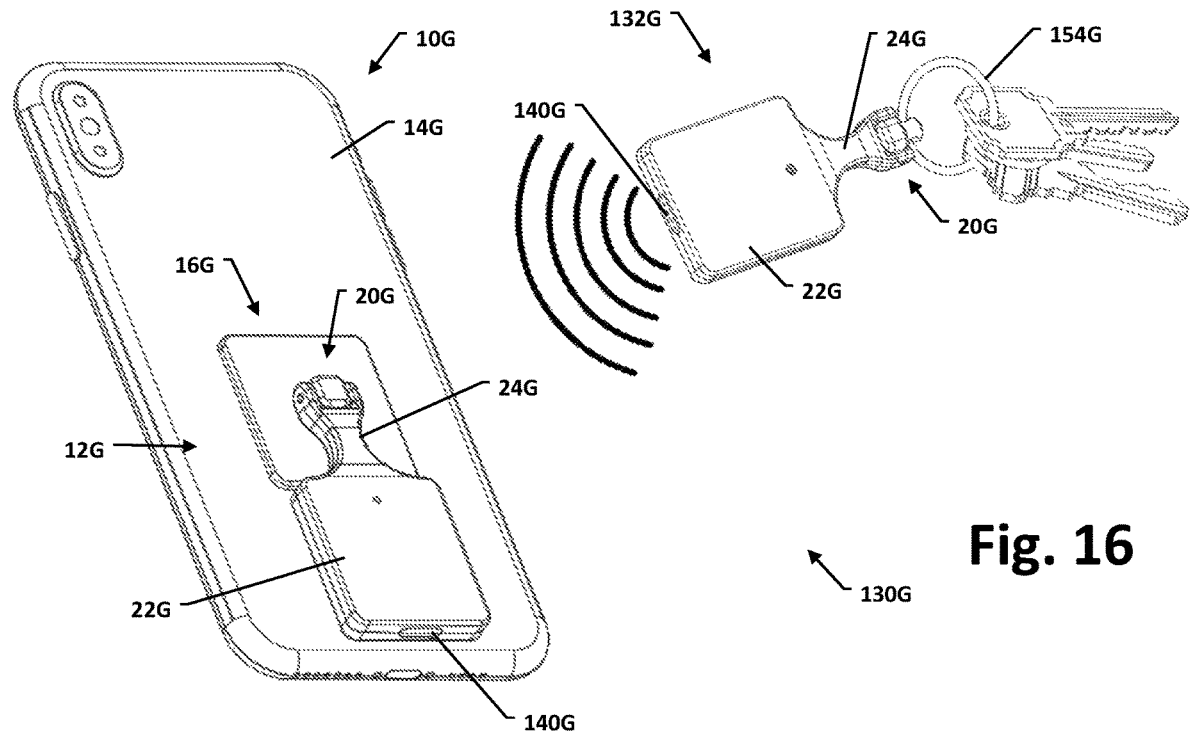
FIG. 16 is a perspective view of a smart device including a smart device accessory attached thereto and incorporated into a device locator system, according to an embodiment of the present invention.
Figure 17:
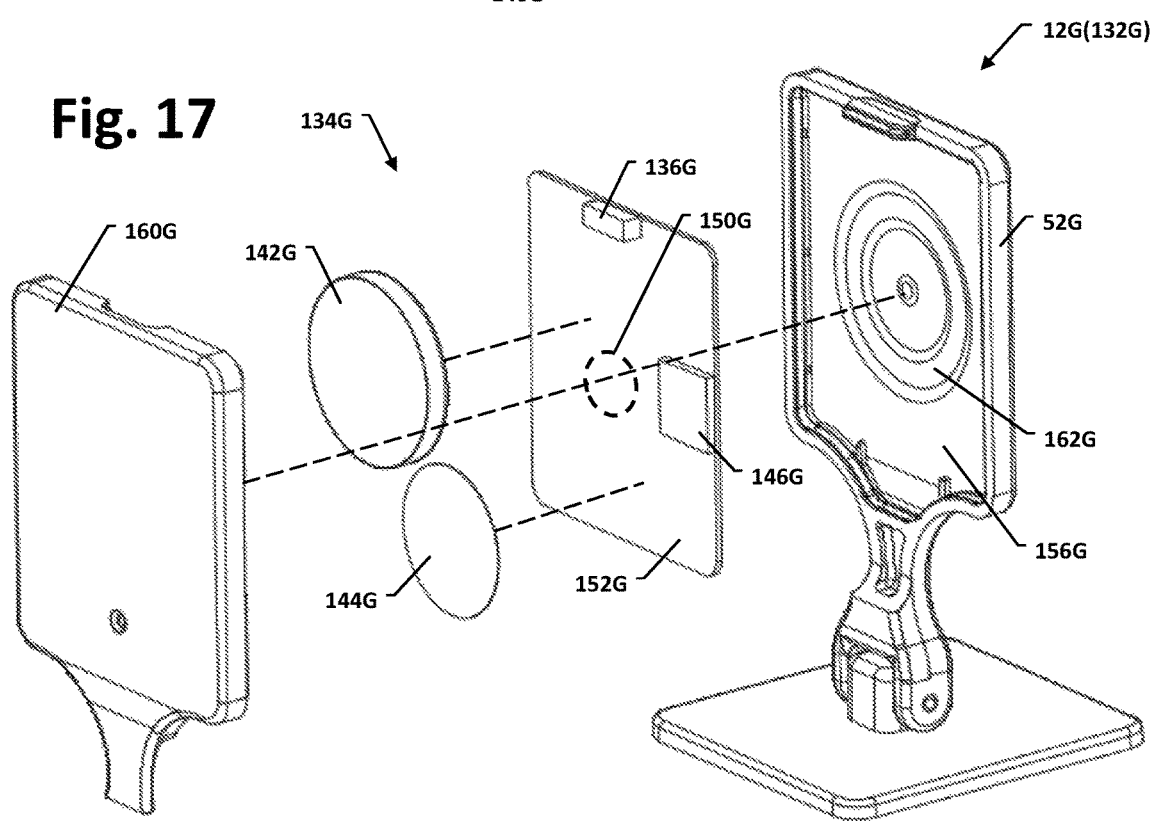
FIG. 17 is a partially exploded perspective view of the smart device accessory of FIG. 16.

Referring to FIGS. 16 and 17, a smart device accessory 12G according to the present invention can also be used in a device locator system 130G with a mated accessory module 132G. The accessory 12G and mated module 132G both incorporate locator electronics 134G therein. In particular, the electronics 134G include an indicator, such a light emitting diode (LED) 136G visible through a lens 140G, a battery 142G, a transmitter/receiver 144G, microcontroller 146G and an actuator button 150G electrically connected via a circuit board 152G. Other indicators could be used instead of, or in addition to, a light. For example, an audible indicator (e.g., a buzzer) could be used.

Upon actuation of the button 150G in either the accessory 12G or mated module 132G (the sending device), the respective microcontroller 146G operates the transmitter/receiver 144G to transmit a coded signal. The transmitter/receiver 144G in the other of the accessory 12G or mated module 132G (the receiving device) receives the coded signal. In response, the corresponding microcontroller 146G operates the indicator to facilitate location of the receiving by the user. In this manner, a user can use either the mated module 132G to locate the accessory 12G (and attached smart device 10G, even if turned off or out of its own battery power), or use the accessory 12G to located the mated module 132G.

Figure 18:
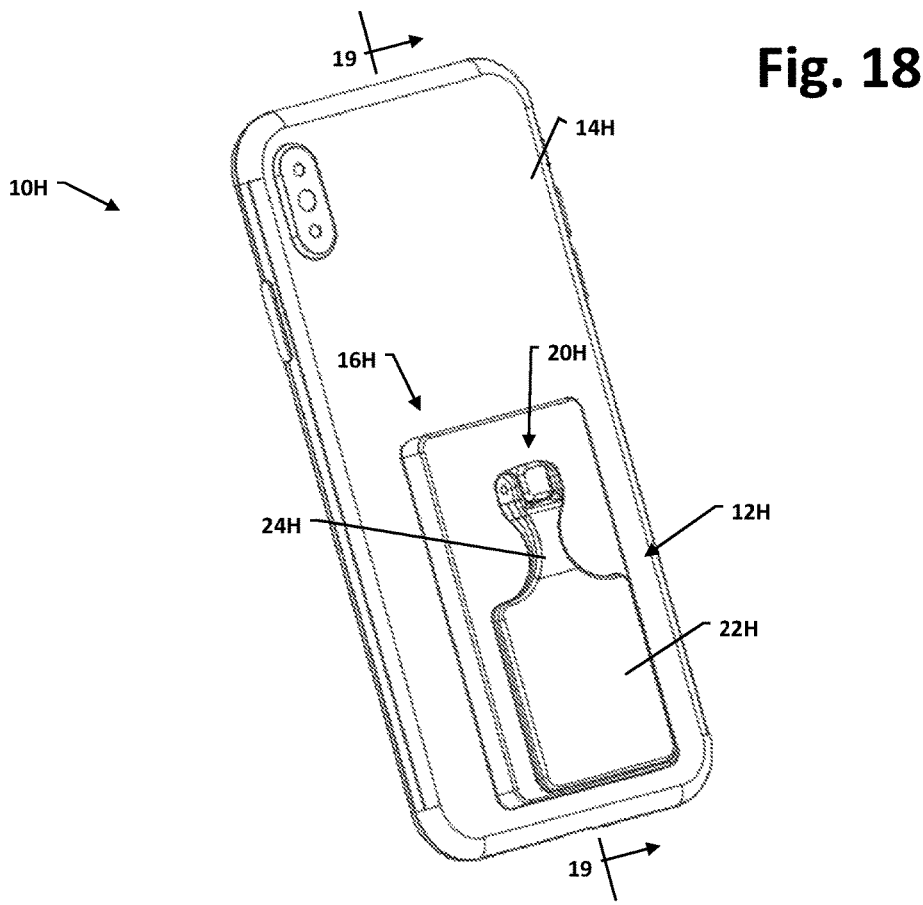
FIG. 18 is a perspective view of another embodiment of a smart device accessory attached to a smart device and usable in connection with a device locator system.
Figure 19:
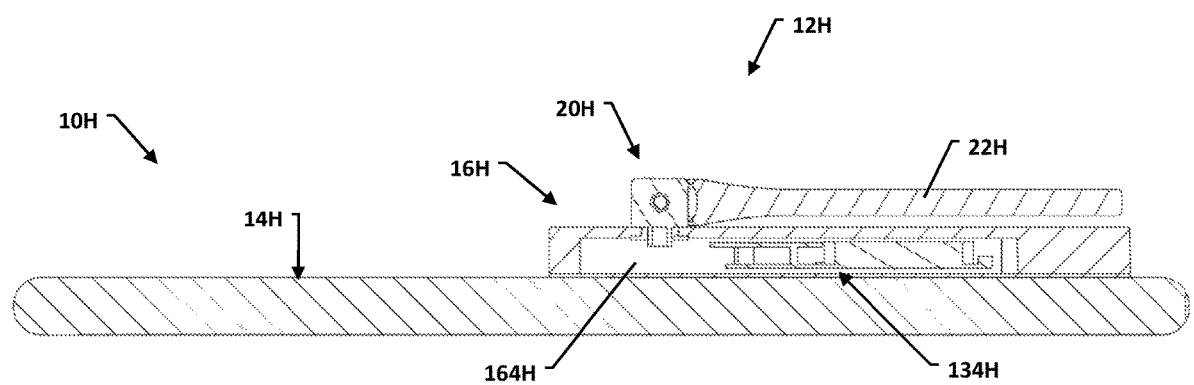
FIG. 19 is a sectional view taken along line 19-19 of FIG. 18.

In the depicted embodiment, the construction of the smart device accessory 12G and the mated accessory module 132G is substantially identical, except the mated module 132G is not connected to a base 16G and its hub 34G is configured for connection to a key ring 154G. In both, the main body 52G of the planar support 22G defines an interior volume 156G enclosed by a removable panel 160G. The locator electronics 134G are housed in the interior volume 156G, with the actuator button 150G being operable by depressing a weakened area 162G formed on the main body 52G. In an alternate embodiment, referring to FIGS. 18 and 19, the locator electronics 134H are located within an interior volume 164H defined within the base 16G.

The foregoing embodiments are provided for illustrative and exemplary purposes; the present invention is not necessarily limited thereto. For instance, features of different embodiments can be combined as desired. For example, a smart device accessory integrated into a phone case or credit card holder could be formed with a bottle opener and be further configured for incorporation into a magnetic mounting arrangement and a device locator system. Those skilled in the art will appreciate that these and other modifications, as well as adaptations to particular circumstances, will fall within the scope of the invention herein shown and described, and of the claims appended hereto.

What is claimed is:

1. A smart device accessory comprising:
   a planar support having a first end and an opposing second end;
   a neck extending directly from the second end of the planar support to an open U-shaped end, the U-shaped end having a first leg and a spaced apart second leg defining an open space therebetween;
   wherein the first leg having a first aperture and the second leg having a second aperture, the first aperture having first internal teeth cut into an inner circumference thereof and the second aperture having second internal teeth cut into an inner circumference thereof;
   a first insert having first external teeth cut in an outer surface thereof and having a first central opening, and a second insert having second external teeth cut in an outer surface thereof and having a second central opening;

the first insert positioned within the first aperture of the first leg to engage the first internal teeth and the first external teeth, and the second insert positioned within the second aperture of the second leg to engage the second internal teeth and the second external teeth;

a hub positioned within the open space of the U-shaped end between the first leg and the second leg, and the hub having a pivot opening therethrough;

a base rotatably secured to the hub; and a pivot pin slidingly passing through the first central opening, through the pivot opening of the hub, and through the second insert, such that the pivot pin, the neck and the planar support are pivotable together relative to the hub and the base.

2. The accessory of claim 1, wherein the base is configured for connection to the reverse surface of the smart device.

3. The accessory of claim 2, wherein the base includes a base plate defining a central plate opening, and the hub includes a hub shaft extending through the central plate opening and being secured by a washer under the base plate.

4. The accessory of claim 2, wherein the base includes an adhesive patch for attachment to the reverse surface of the smart device.

5. The accessory of claim 2, wherein the base is incorporated into a case for the smart device.

6. The accessory of claim 5, wherein the case includes a recess accommodating a thickness of the neck and planar support when folded flat against the reverse surface of the smart device.

7. The accessory of claim 2, wherein the base includes a slot configured to hold at least one credit card flat against the reverse surface.

8. The accessory of claim 1, wherein the planar support includes a bottle opener formed in the main support body.

9. The accessory of claim 8, where in the bottle opener is formed in a side of the main support body between the first and second support ends.

10. The accessory of claim 8, wherein the bottle opener is formed centrally in the main support body and extends therethrough.

11. The accessory of claim 1, further comprising locator electronics arranged within the accessory, the locator electronics including an indicator, a battery, a transmitter/receiver, and a microcontroller, the locator electronics being configured to receive a signal and actuate the indicator in response thereto.

12. The accessory of claim 11, wherein the locator electronics further include an actuator button, the locator electronics being further configured to transmit the signal in response to actuation of the actuator button.

13. A combination comprising:
the smart device accessory of claim 1; and
a smart device with a reverse surface rotatably attached to the hub.

14. The combination of claim 13, wherein the hub is directly connected to the reverse surface.

15. The combination of claim 14, wherein the smart device accessory further includes a base rotatably attached to the hub, the base being connected to the reverse surface.

16. A magnetic mounting arrangement comprising:
the smart device accessory of claim 1; and
a magnetic mount including a mount base securable to a mounting surface and mounting face including another magnetic material magnetically connected to the planar support.

17. The magnetic mounting arrangement of claim 16, wherein the mount base is connected to the mounting face with a ball joint.

18. The smart device accessory of claim 1, further comprising a sleeve positioned within the pivot opening of the hub for receiving the pivot pin, and the sleeve and pivot pin having a friction fit such that a desired position of the planar support is maintained.

* * * * *